US 6,398,691 B1

(12) United States Patent
Takizawa et al.

(10) Patent No.: US 6,398,691 B1
(45) Date of Patent: Jun. 4, 2002

(54) SPEED RATIO CONTROL DEVICE (75) Inventors: Satoshi Takizawa, Yokohama; Masato Koga, Atsugi; Masatoshi Akanuma, Fujisawa; Mitsuru Watanabe; Shigeki Shimanaka, both of Hadano; Hiroyasu Tanaka, Zama; Junya Takayama, Oomiya, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 63 days.

(21) Appl. No.: 09/670,822

(22) Filed: Sep. 28, 2000

(30) Foreign Application Priority Data

Sep. 30, 1999 (JP) ............................................ 11-280362
Sep. 30, 1999 (JP) ............................................ 11-280417

(51) Int. Cl.[7] ............................................. B60K 41/12
(52) U.S. Cl. ............................. 477/37; 477/115; 701/52
(58) Field of Search ............................. 477/37, 41, 111, 477/115; 701/52, 54

(56) References Cited

U.S. PATENT DOCUMENTS 4,589,532 A * 5/1986 Ito et al. ........................ 477/81
5,890,991 A * 4/1999 Sakakiyama ............... 701/52 X
5,997,430 A * 12/1999 Tanabe ........................ 477/46
6,076,031 A * 6/2000 Takizawa et al. ......... 701/54 X
6,183,390 B1 * 2/2001 Kaga et al. ................... 477/37

FOREIGN PATENT DOCUMENTS

| JP | 361238538 | * 10/1986 | ................. 475/153 |
| JP | 09-196156 | 7/1997 | |
| JP | 09-264416 | 10/1997 | |
| JP | 2001235018 | * 8/2001 | |

* cited by examiner

Primary Examiner—Charles A. Marmor
Assistant Examiner—Ha Ho
(74) Attorney, Agent, or Firm—Foley & Lardner (57) ABSTRACT A speed change control device for an automatic transmission wherein the speed ratio is automatically varied according to a running state when an automatic shift mode is selected, and the speed ratio is varied based on a manual operation when the manual shift mode is selected. When there is a change-over from the automatic shift mode to the manual shift mode, a speed ratio immediately after the change-over is set to a speed ratio such that a transmission input rotation speed after the change-over increases by at least a predetermined rotation speed compared to the transmission input rotation speed before the change-over. In this way, the effectiveness of engine braking is enhanced immediately after a change-over to the manual shift mode, or a downshift for acceleration can be definitively performed.

4 Claims, 12 Drawing Sheets

SPEED RATIO CONTROL DEVICE

FIELD OF THE INVENTION

The present invention relates to speed ratio control of an automatic transmission, and more particularly, to a speed ratio control device wherein the effectiveness of engine braking is enhanced when there is a change-over from an automatic shift to mode to a manual shift mode.

BACKGROUND OF THE INVENTION

In one type of automatic transmission for vehicles, a selection can be made between an automatic shift mode and a manual shift mode. JP-A-H9-196156 and JP-A-H9-264416, which were published by the Japanese Patent Office in 1997, disclose a speed change device which selects a gear position such that the fluctuation of an input rotation speed becomes small before and after a change-over from an automatic shift mode to a manual shift mode.

SUMMARY OF THE INVENTION

In general, when a driver changes over from an automatic shift mode to a manual shift mode, he often expects a downshift for acceleration immediately after the change-over or a downshift to enhance the effectiveness of engine braking.

However, in the aforesaid prior art device, there is not always a downshift immediately after the change-over, and it is not possible to appropriately satisfy this demand.

It is therefore an object of this invention to ensure a downshift for a subsequent acceleration or the enhancement of engine braking by selecting a gear position at which a transmission input rotation speed will definitely be above a predetermined value when there is a change-over from the automatic shift mode to the manual shift mode.

In order to achieve above object, the present invention provides a speed ratio control device for use with a vehicle provided with an automatic transmission. The device comprises an actuator which varies a speed ratio of the transmission, and a microprocessor for controlling the actuator and programmed to vary the speed ratio automatically according to a running state when an automatic shift mode is selected, vary the speed ratio based on a manual operation when a manual shift mode is selected, and set the speed ratio immediately after a change-over is made from the automatic shift mode to the manual shift mode, to a speed ratio which increases a transmission input rotation speed after the change-over more than a predetermined rotation speed compared to the transmission input rotation speed before the change-over.

The details as well as other features and advantages of this invention are set forth in the remainder of the specification and are shown in the accompanying drawings.

DESCRIPTION OF THE PREFERRED EMBODIMENTS

Figure 1:
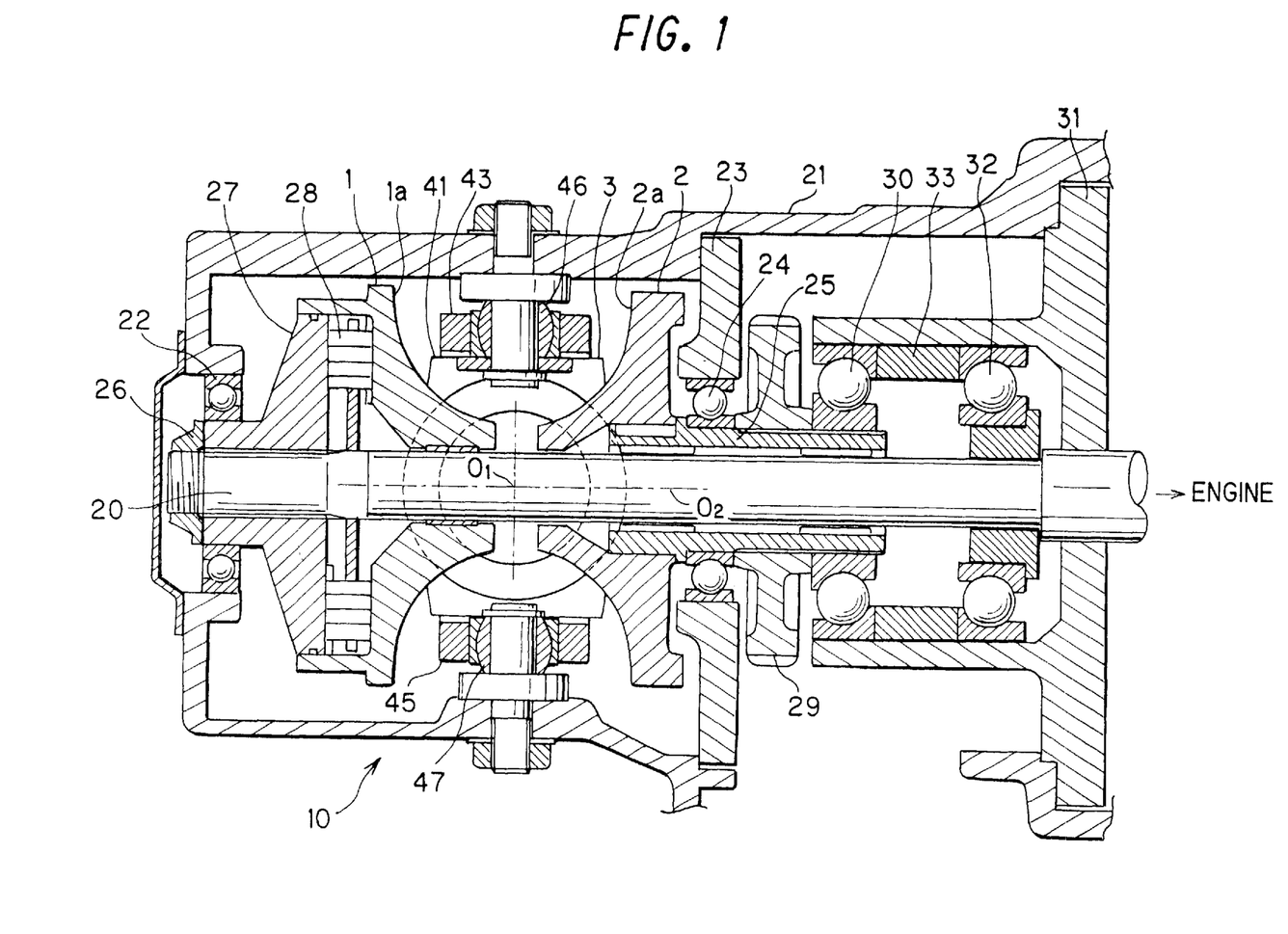
FIG. 1 is a longitudinal cross-sectional view of a toroidal continuously variable transmission according to this invention.

Referring to FIG. 1 of the drawings, a toroidal continuously variable transmission (CVT) 10 according to this invention comprises an input shaft 20 connected to an engine, not shown, via a torque converter. One end of the input shaft 20 is supported by a bearing 22 in a transmission case 21, and the middle is supported via a bearing 24 and a hollow output shaft 25 in an intermediate wall 23 of the transmission case 21.

An input disk 1 is supported by the input shaft 20. An output disk 2 is supported by the output shaft 25. The input disk 1 and output disk 2 are arranged so that their toroidal curved surfaces 1a, 2a face each other.

A pair of power rollers 3 disposed on either side of the input shaft 20 are gripped between the surfaces 1a and 2a.

In order to grip the power rollers 3 between the input disk 1 and output disk 2, a nut 26 is tightened at the tip of the input shaft 20. The nut 26 is tightened so that a cam disk 27 does not fall out of the input shaft 20. Cam rollers 28 are provided between the cam disc 27 and the input disk 1. The rotation of the input shaft 20 is transmitted to the input disk 1 via the cam rollers 28.

The rotation of the input disk 1 is transmitted to the output disk 2 via the power rollers 3. The cam rollers 28 generate a thrust force proportional to the transmitting torque, and grip the power rollers 3 between the input disk 1 and output disk 2.

The output disk 2 is spline jointed to the output shaft 25. An output gear 29 is fixed on the output shaft 25.

The output shaft 25 is supported by a cover 31 of the transmission case 21 via a radial thrust bearing 30. The input shaft 20 is supported by the cover 31 via a radial thrust bearing 32. The bearings 30, 32 cannot approach each other due to a spacer 33. Further, the bearings 30, 32 respectively contact an output gear 29 and the input shaft 20, and cannot move away from each other.

Therefore, the thrust force which acts on the input disk 1 and the output disk 2 due to the cam rollers 28 is cancelled at the spacers 33, and does not act on the transmission case 21.

Figure 2:
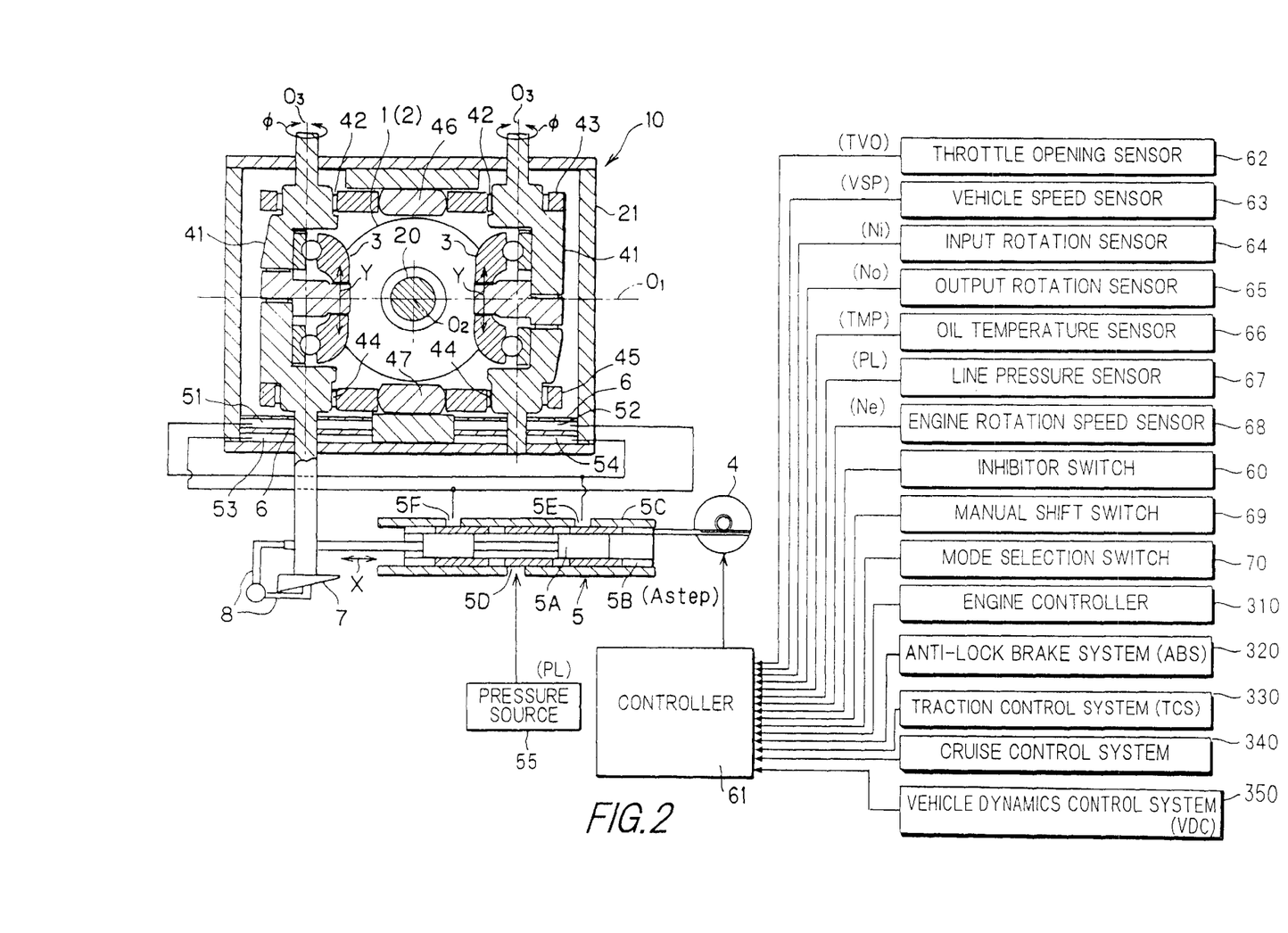
FIG. 2 is a transverse cross-sectional view of the transmission, and the schematic diagram of a speed ratio control device.

The power rolers 3 are supported free to rotate by trunnions 41, as shown in FIG. 2. The upper ends of the trunnions 41 are joined to an upper link 43 via a spherical joint 42 so that they are free to rotate and free to pivot, and their lower ends are joined to a lower link 45 via a spherical joint 44 so that they are free to rotate and free to pivot The upper link 43 and the lower link 45 are supported with their centers free to pivot on spherical joints 46, 47, and the trunnions 41 can be displaced vertically in synchronism in mutually opposite directions.

The speed ratio control device of the aforesaid transmission 10 will now be described referring to FIG. 2.

A piston 6 for displacing the trunnion 41 in a vertical direction is provided at each trunnion 41. Upper chambers 51, 52 and lower chambers 53, 54 are respective formed on either side of these pistons 6. A speed ratio control valve 5 for controlling the displacement of each piston 6 is provided.

The speed ratio control valve 5 comprises a spool 5A, sleeve 5B and valve case 5C. The spool 5A and sleeve 5B fit together so that they are free to slide relative to each other. The sleeve 5B fits in the valve case 5C so that they are free to slide relative to each other.

A port 5D of the speed ratio control valve 5 is connected to a pressure source 55. A port 5E of the speed ratio control valve 5 is connected to the piston chambers 51, 54. A port 5F is connected to the piston chambers 52, 53.

The spool 5A operates together with a precess cam 7 fixed to the lower end of one of the trunnions 41 via a link. The sleeve 5B is engaged with a step motor 4 by a rack and pinion.

An operating command to the speed ratio control valve 5 is supplied as a displacement to the outer sleeve 5B by the step motor 4.

If the sleeve 5B displaces from the neutral position relative to the spool 5A due to this operating command, for example to the position shown in FIG. 2, the speed ratio control valve 5 will open, a fluid pressure (line pressure PL) will be supplied to the chambers 52, 53 from the pressure source 55, and the other chambers 51, 54 will be drained. The trunnions 41 then displace in mutually opposite directions up and down due to the pistons 6.

On the other hand, if the sleeve 5B displaces from the neutral position relative to the spool 5A in the reverse direction, the speed ratio control valve 5 will open, a fluid pressure will be supplied to the chambers 51, 54 from the pressure source 55, and the other chambers 52, 53 will be drained. The trunnions 41 then displace in mutually opposite directions up and down due to the pistons 6, 6.

As a result, the power rollers 3 are offset from the position where the rotation axis shaft $O_1$ intersects the rotation axis $O_2$ of the disks 1 and 2. The offset power rollers 3 receive a force from the disks 1 and 2, and gyrate around the rotation axis $O_3$ which is perpendicular to the axis $O_1$ so as to realize continuous variable speed change.

The precess cam 7 provided on a lower end of one of the trunnions 41 performs mechanical feedback of an offset Y and ignition angle $\phi$ of the trunnion 41 and power roller 3 as a displacement X of the spool 5A via a link 8.

When a speed ratio command value corresponding to a command value Astep to the step motor 4 is achieved by a continuously variable speed change, the spool 5A is returned to the neutral position relative to the sleeve 5B by the aforesaid mechanical feedback. Simultaneously, the power rollers 3 are returned to a position where the rotation axis $O_1$ intersects the rotation axis $O_2$ of the disks 1 and 2, thereby maintaining the aforesaid speed ratio command value.

In order to make the gyration angle $\phi$ of the power roller 3 a value corresponding to the speed ratio command value, it is sufficient for the precess cam 7 to feed back the gyration angle $\phi$ of the power roller 3. However, in order to prevent the speed ratio control from hunting, the offset Y of the power roller 3 is also fed back.

The command value Astep to the step motor 4 is determined by the controller 61.

The controller 61 comprises a microprocessor, read only memory, random access memory and input/output interface, and the following signals are input to the controller 61 as shown in FIG. 2.

throttle opening signal TVO from a throttle opening sensor 62 sensor detected vehicle speed signal VSP from a vehicle speed sensor 63 transmission input rotation speed signal Ni (or engine rotation speed signal Ne) from an input rotation sensor 64 transmission output rotation speed signal No from an output rotation sensor transmission oil temperature signal TMP from an oil temperature sensor 66 line pressure signal PL from a line pressure sensor 67 engine rotation speed signal Ne from an engine rotation speed sensor 68 shift lever position signal from an inhibitor switch 60 up-shift signal and down-shift signal from a manual shift switch 69 selected mode signal from a mode selection switch 70 torque-down signal from an engine controller 310 signal showing an operating state of an anti-lock brake system (ABS) 320 from the anti-lock brake system 320 signal showing an operating state of a traction control system (TCS) 330 from the traction control system 330.

auto-cruise signal from a cruise control system 340 signal showing an operating state of a vehicle dynamics control system (VDC) 350 from the vehicle dynamics system 350.

Here, as the line pressure PL is controlled by the controller 61, it is usually detected from an internal signal of the controller 61. The vehicle speed sensor 63 detects the vehicle speed from a rotation speed of, for example, the output shaft of the transmission 10, a drive shaft or a driving wheel.

The controller 61 computes the command value Astep to the step motor 4 on the basis of the aforesaid input signals.

Figure 3:
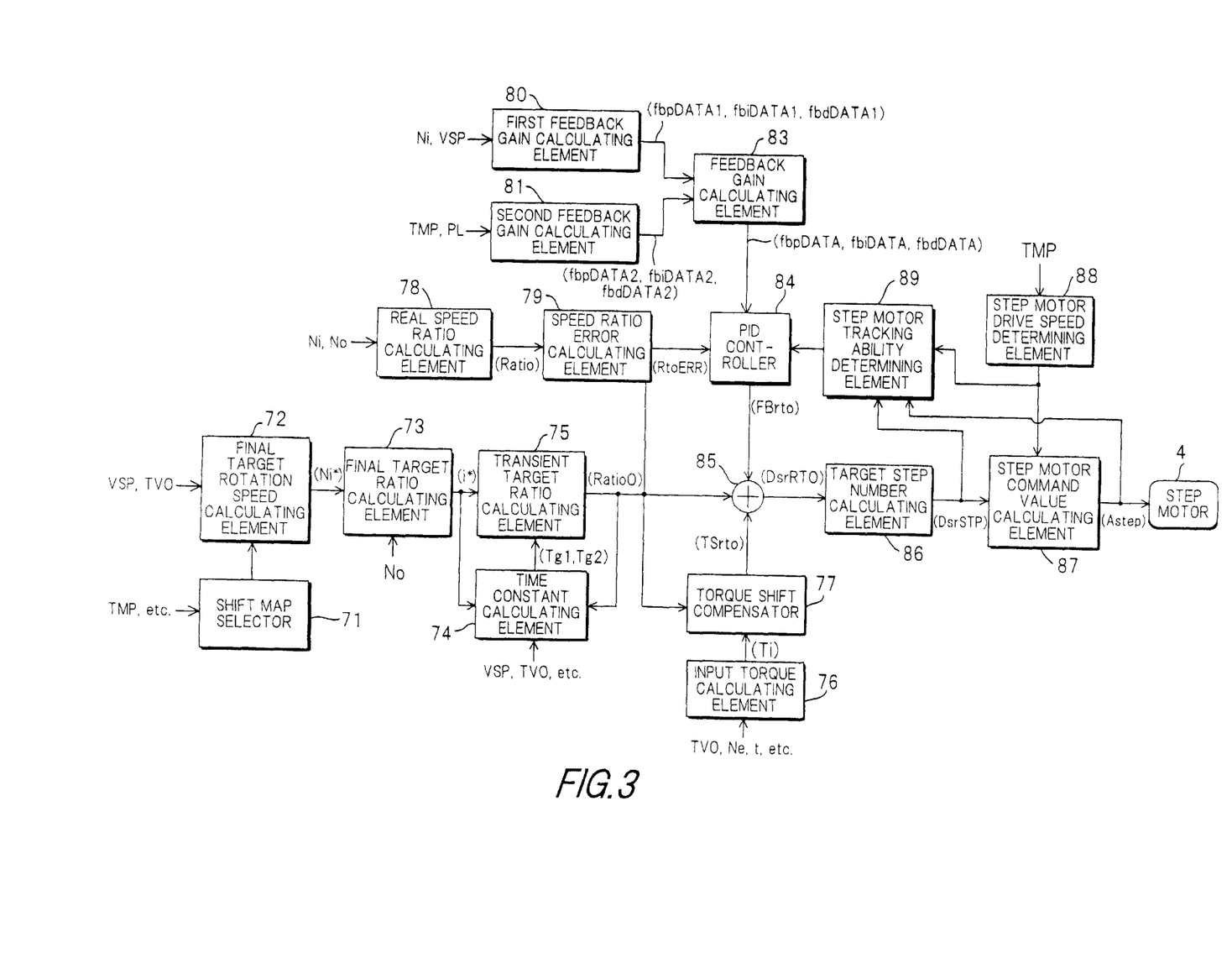
FIG. 3 is a block diagram of a controller of the speed ratio control device.

The controller 61 comprises the elements shown in FIG. 3. These elements actually comprise a computer program stored by the memory of the controller 61 or an electronic circuit of the controller 61.

Figure 4:
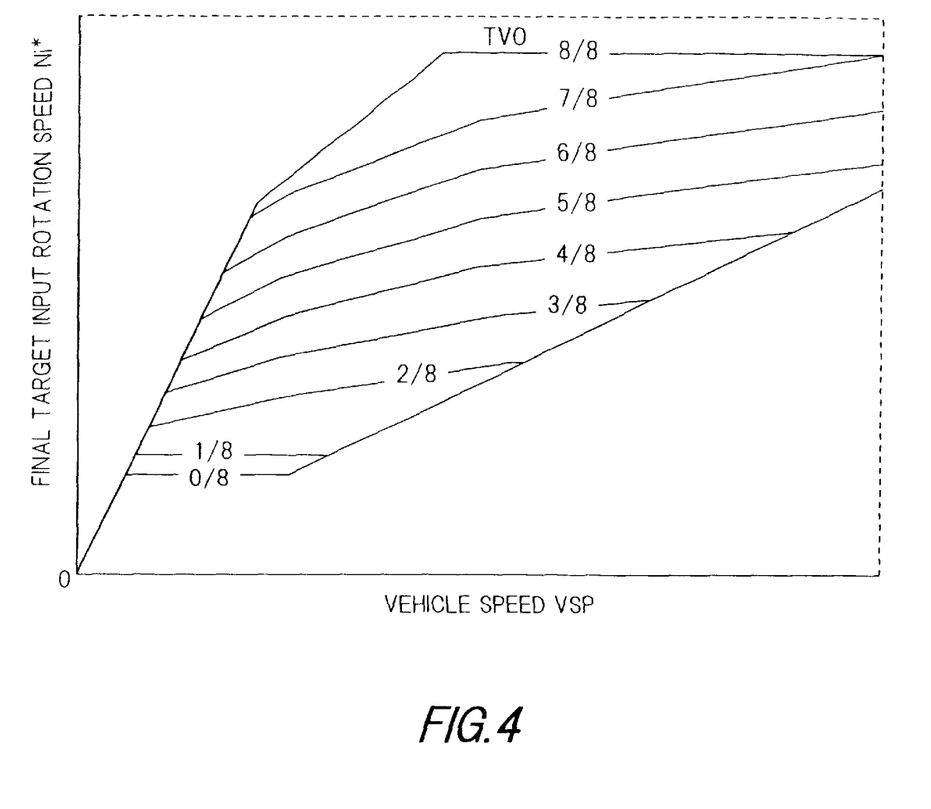
FIG. 4 is an example of a shift map used for speed ratio control.

A shift map selector 71 selects a map to be used from among plural pre-prepared maps depending on the transmission oil temperature TMP, and whether or not an exhaust gas purification catalyst has activated. FIG. 4 is an example of a shift map.

A final target input rotation speed calculating element 72 calculates a final target input rotation speed Ni* by looking up the shift map shown in FIG. 4 based on the throttle opening TVO and vehicle speed VSP. The final target rotation speed Ni* is the target value of the input rotation speed in the steady running state.

A final target ratio calculating element 73 calculates a final target ratio i* by dividing the final target input rotation speed Ni* by the transmission output rotation speed No. The final target ratio i* is the target value of the speed ratio in the steady running state.

A time constant calculating element 74 determines a first speed change time constant Tg1 and second speed change time constant Tg2 used in speed change control according to the shift lever position (the normal running position "D" or sports running position "Ds", etc.), vehicle speed VSP, throttle opening TVO, engine rotation speed Ne, accelerator pedal depression rate, the torque-down signal, the anti-lock brake control signal, the traction control signal, the auto-cruise signal, the vehicle to dynamics control sign (VDC signal) and a speed ratio difference RtoERR between the real speed ratio Ratio and a transient target ratio RatioO described later, and computes a difference Eip between the final target ratio i* and transient target ratio RatioO.

The first speed change time constant Tg1 and second speed change time constant Tg2 which are determined corresponding to a second order delay of the toroidal CVT 10, determine the speed change response relative to the final target ratio i*, and determine a speed change rate.

A transient target ratio calculating element 75 computes the transient target ratio RatioO and an intermediate speed ratio RatioOO for bringing a real speed ratio Ratio close to the final target ratio i* with a speed response defined by the first speed change time constant Tg1 and second speed change time constant Tg2, and outputs the transient target ratio RatioO.

An input torque calculating element 76 calculates a transmission input torque Ti. First, the input torque calculating element 76 calculates the engine output torque based on the throttle opening TVO and engine rotation speed Ne. Next, a torque ratio t of the torque converter is found based on the ratio of the input rotation speed (=Ne) and output rotation speed (=Ni) of the torque converter. Finally, the output torque of the engine is multiplied by the torque ratio t to compute the transmission input torque Ti.

A torque shift compensator 77 computes a compensation amount TSrto for a compensating a torque shift (speed ratio deviation) peculiar to a toroidal CVT based on the transient target ratio RatioO and input torque Ti of the transmission 10.

During torque transmission, the power rollers 3 are gripped between the input disk 1 and output disk 2, so the trunnions 41 deform. Due to this deformation, the position of the precess cam 7 provided on the lower end of the trunnion 41 varies, and the characteristics of the mechanical feedback stem comprising the precess cam 7 and link 8 vary resulting in the aforesaid torque shift.

As the torque shift of the toroidal CVT differs according to the transient target ratio RatioO and transmission input torque Ti, the torque shift compensator 77 calculates the torque shift compensation amount TSrto by looking up a predetermined two-dimensional map based on the transient target ratio RatioO and transmission torque Ti.

A real speed ratio calculating element 78 computes the real speed ratio Ratio by dividing the transmission input rotation speed Ni by the transmission output rotation speed No. A speed ratio error calculating element 79 subtracts the real speed ratio Ratio from the transient target ratio RadioO to compute the speed ratio error RtoERR (=RatioO−Ratio).

A first feedback gain calculating element 80 computes a first proportional control feedback gain fbpDATA1, a first integral control feedback gain fbiDATA1 and a first differential control feedback gain fbdDATA1 according to the transmission input rotation speed Ni and vehicle speed VSP. The first feedback gains fbpDATA1, fbiDATA1 and fbd-DATA1 are used when a feedback correction amount FBrto is computed by PID control described later.

The first feedback gains fbpDATA1, fbiDATA1 and fbf-DATA1 are computed by looking up a predetermined two-dimensional map based on the transmission input rotation speed Ni and vehicle speed VSP.

A second feedback gain calculating element 81 computes a second proportional control feedback gain fbpDATA2, a second integral control feedback gain fbiDATA2 and a second differential control feedback gain fbdDATA2 according to the oil temperature TMP and line pressure PL of the transmission 10. The feedback gains fbpDATA2, fbiDATA2 and fbdDATA2 are also used when the feedback correction amount FBrto is computed by PID control, described later.

The second feedback gains fbpDATA2, fbiDATA2 and fbdDATA2 are computed by looking up a two-dimensional map based on the transmission oil temperature TMP and the line pressure PL.

A feedback gain calculating element 83 multiplies corresponding first feedback gains and second feedback gains so as to compute a proportional control feedback gain fbd-DATA (=fbdDATA1×fbdDATA2), an integral control feedback gain fbiDATA (=fbiDATA1×fbiDATA2), and a differential control feedback gain fbdDATA (=fbdDATA1× fbdDATA2).

A PID controller 84 computes a feedback correction amount by proportional control (=RtoERR×fbdDATA), a feedback correction amount by integral control (=∫{RtOERR×fbiDATA}), and a feedback correction amount by differential control (=(d/dt){RtoERR× fbdDATA4}). These three feedback correction amounts are then added to compute the feedback correction amount FBrto (=RtoERR×fbpDATA+∫{RtoERR×fbiDATA}+(d/dt) {RtoERR×fbdDATA}) under PID control.

A transient target ratio corrector 85 corrects the transient target ratio RatioO by the torque sift compensation amount TSrto and the speed ratio feedback correction amount FErto, and computes a compensated transient target ratio DsrRTO (=Ratio+TSrto+FBrto).

A target step number calculating element 86 computes a target step number DsrSTP of the step motor 4 which realizes the compensated transient target ratio DsrRTO by looking up a predetermined map.

When the step motor 4 cannot displace to the aforesaid target step number DsrSTP during one control cycle even at the maximum drive speed of the step motor 4 determined according to the transmission oil temperature TMP by a step motor drive speed determining element 88, a step motor command value calculating element 87 takes a position which can be realized at the maximum drive speed of the step motor 4 as the command value Astep to the step motor 4. On the other hand, when the step motor 4 can displace to the aforesaid target step number DsrSTP during one control cycle, the target step number DsrSTP is set to the command value Astep to the step motor 4.

Therefore, it can be considered that command value Astep is the actual position of the step motor 4.

The step motor 4 rotates in the direction and position corresponding to the command value Astep, displaces the sleeve 5B of the speed ratio control valve 5 by the rack and pinion, and changes the speed ratio of the CVT 10.

When the speed ratio corresponding to the command value Astep is attained, the spool 5A is returned to the neutral position relative to the sleeve 5B by mechanical feedback via the precess cam 7. Simultaneously, the power rollers 3 are returned to the position at which the rotation axis $O_1$ intersects the rotation axis $O_2$ of the disks 1 and 2. Thereby, the speed ratio command value is maintained.

A step motor tracking ability determining element 89 determines whether or not the step motor 4 can follow the target step number DsrSTP corresponding to the compensated transient target ratio DsrRTO. First, the determining element 89 calculates a step number difference ΔSTP between the target step number DsrSTP and the command value Astrp which can be considered as the actual position. When the step number error ΔSTP is smaller than a value ΔSTPLIM which the step motor 4 can eliminate during one control cycle at the maximum drive speed of the step motor 4 determined as described above by the step motor drive speed determining element 88 (ΔSTP<ΔTPLIM), the determining element 89 determines that the step motor 4 can follow the target step number DsrSTP corresponding to the compensated transient target ratio DsrRTO. Conversely, when the step number error ΔSTP is larger than the value ΔSTPLIM (ΔSTP≧ΔSTPLIM), it determines that the step motor 4 cannot follow the target step number DsrSTP.

When it is determined that the step motor 4 can follow the target step number DsrSTP corresponding to the compensated transient target ratio DsrRTO, the determining element 89 commands the PID controller 84 to continue the computing of the speed ratio feedback correction amount FBrto by the aforesaid PID control. On the other hand, when it is determined that the step motor 4 cannot follow the target step number DsrSTP, the determining element 89 commands the PID controller to maintain the speed ratio feedback correction amount $\int\{EtoERR \times fbiDATA\}$ by integral control at its value at the time of the determination.

In the step motor command value calculating element 87, when the step motor 4 cannot displace to the target step number DsrSTP during one control cycle even at the maximum drive speed of the step motor 4, the position which can be realized at the maximum drive speed of the step motor 4 is taken as the command value Astep, and the command value Astnp is used for the step motor tracking ability determination by the determining element 89 as the real position of the step motor 4. Hence, it is possible to know the real position of the step motor 4 when the tracking ability determination is performed from the command value Astep to the step motor 4. For this reason, it is unnecessary to actually detect the position of the step motor 4 to perform the tracking ability determination.

Further, in the step motor tracking ability determining element 89, when the step number error ΔSTF between the target step number DsrSTP and the actual drive position (=command value Astep) is smaller than the value ΔSTPLIM which is determined according to the maximum drive speed of the step motor 4 (ΔSTP<ΔSTPLIM), it is determined that the step motor 4 can follow the target step number DsrSTP corresponding to the compensated transient target ratio DsrRTO. Conversely, when the step number error ΔSTF is greater than the value ΔSTPLIM which is defined according to the maximum drive speed of the step motor 4 (ΔSTP≧ΔSTPLIM, it is determined that the step motor 4 cannot follow the target step number DsrSTP. Thus, the determination of the tracking ability of the step motor 4 can be performed precisely although the maximum drive speed of the step motor 4 varies according to the oil temperature TMP, etc.

Next, the speed ratio control performed by the controller 61 will be described referring to FIGS. 5–9.

Figure 5:
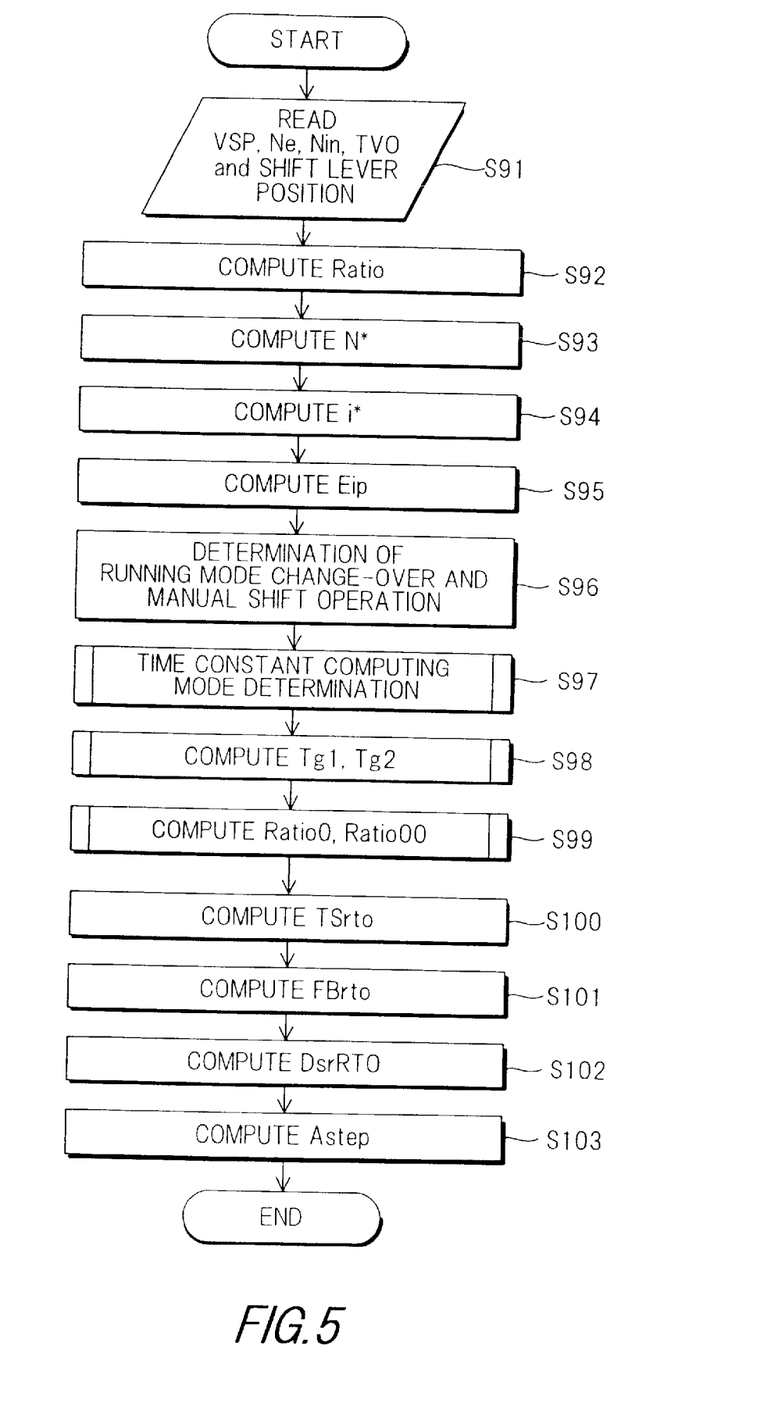
FIG. 5 is a flowchart for describing a main speed ratio control routine performed by the controller.

FIG. 5 shows the main routine of speed ratio control. This routine is performed at an interval of 10 milliseconds.

In a step S91, the vehicle speed VSP, engine rotation speed Ne, transmission input rotation speed Ni, throttle opening TVO and a shift lever position are read. The step S91 corresponds to processing of the time constant calculating element 74.

In a step S92, the real speed ratio Ratio is computed by dividing the input rotation speed Ni by the transmission output rotation speed No. The step S92 corresponds to processing by the final target input rotation speed calculating element 72.

In a step S93, the final target input rotation speed Ni is computed based on the throttle opening TVO and vehicle speed VSP by looking up the map shown in FIG. 4. The step S93 corresponds to processing by the shift map selector 71 and the final target input rotation speed calculating element 72.

In a step S94, the final target ratio i* is computed by dividing the final target input rotation speed Ni* by the transmission output rotation speed No. The step S94 corresponds to processing by the final target ratio calculating element 73.

In a step S95, the difference Eip is computed by subtracting the transient target ratio Ratio computed on the immediately preceding occasion the routine was performed (this is computed at the next step S99) from the final target ratio i*. The step S95 corresponds to processing by the time constant calculating element 74.

In a step S96, it is determined whether or not there has been a running mode change-over, or a manual shift operation. Specifically, it is detected whether or not there is a change-over between a power mode and a snow mode according to the signal from a mode selection switch 70. It is detected whether the shift lever is in the manual shift mode according to the signal from the inhibitor switch 60, and whether an upshift signal or downshift signal is detected from a manual shift switch 69. The step S96 also corresponds to processing by the time constant calculating element 74.

In steps S97, 98 and 99, the time constant computing mode is determined, and the first and second speed change time constants Tg1, Tg2, the transient target ratio RatioO and the intermediate speed ratio RatioOO are computed, respectively. The steps S97, 98 and 99 also correspond to processing by the time constant calculating element 74.

In a step S100, the torque shift compensation amount TSrto is computed based on the transient target ratio RatioO and the transmission input torque T. The step S100 corresponds to processing by the torque shift compensator 77.

In a step S101, the feedback correction amount FBrto is computed by PID control. The step S101 corresponds to processing by the PID controller 84.

In a step S102, the torque shift compensation amount TSrto and feedback correction amount FBrto are added to the transient target ratio RatioO to compute the compensated transient target ratio DsrRTO. The step S102 corresponds to processing by the transient target ratio collector 85.

In a step S103, the command value Astep to the step motor 4 is computed. The step S103 corresponds to processing by the target step number calculating element 86 and the step motor command value calculating element 87.

Figure 6:
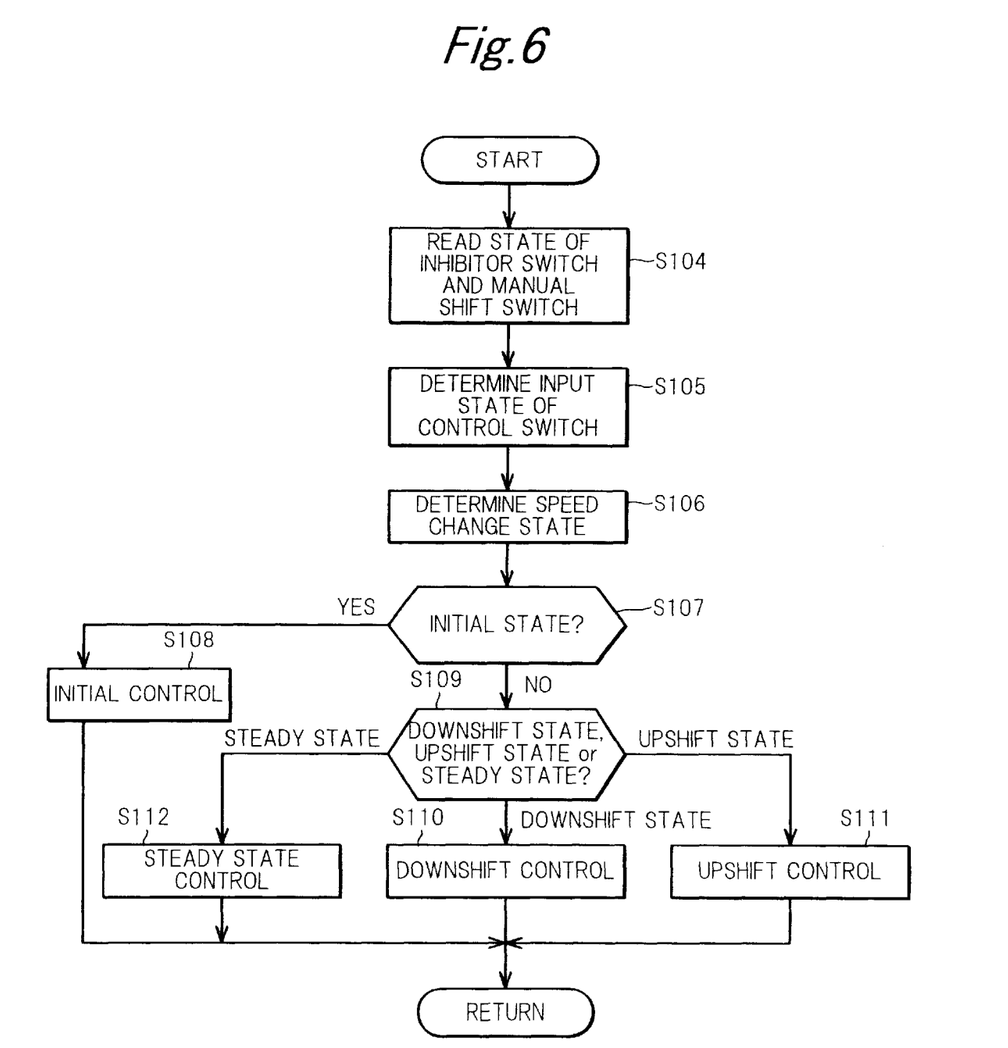
FIG. 6 is a flowchart for describing a speed ratio control routine in a manual shift mode.

FIG. 6 shows a speed ratio control routine in the manual shift mode.

In a step S104, a state of the inhibitor switch 60 and a state of the manual shift switch 69 are read.

In a step S105, an input state of a control switch signal (manual range signal, up signal, down signal, gate signal) is determined.

In a step S106, a speed change state in the manual shift mode (downshift state, upshift state, steady state) is determined.

Figure 7:
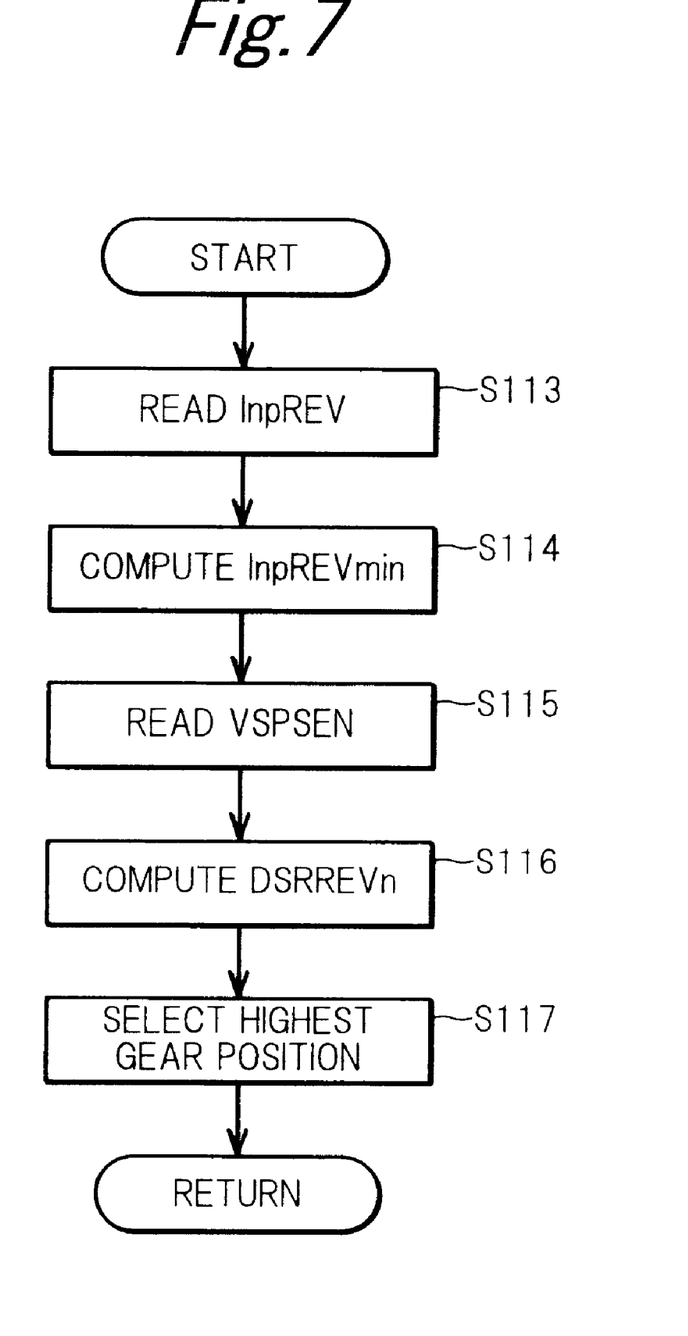
FIG. 7 is a flowchart for describing an initial control subroutine in the manual shift mode.

In a step S107, when an immediately preceding running mode is not the manual shift mode (i.e., the immediately preceding shift mode is an automatic shift mode) and the current shift mode is the manual shift mode, it is determined that the vehicle is in an initial state immediately after the shift mode has been changed over to the manual shift mode, and the routine proceeds to a step S108. In the step S108, an initial control of FIG. 7 is performed.

When the vehicle is not in the initial state, the routine proceeds to a step S109 and it is determined whether the speed change state is the downshift state, upshift state or steady state based on the manual range signal, and a combination of the up signal, down signal and gate signal on the immediately preceding occasion and the present occasion.

Figure 8:
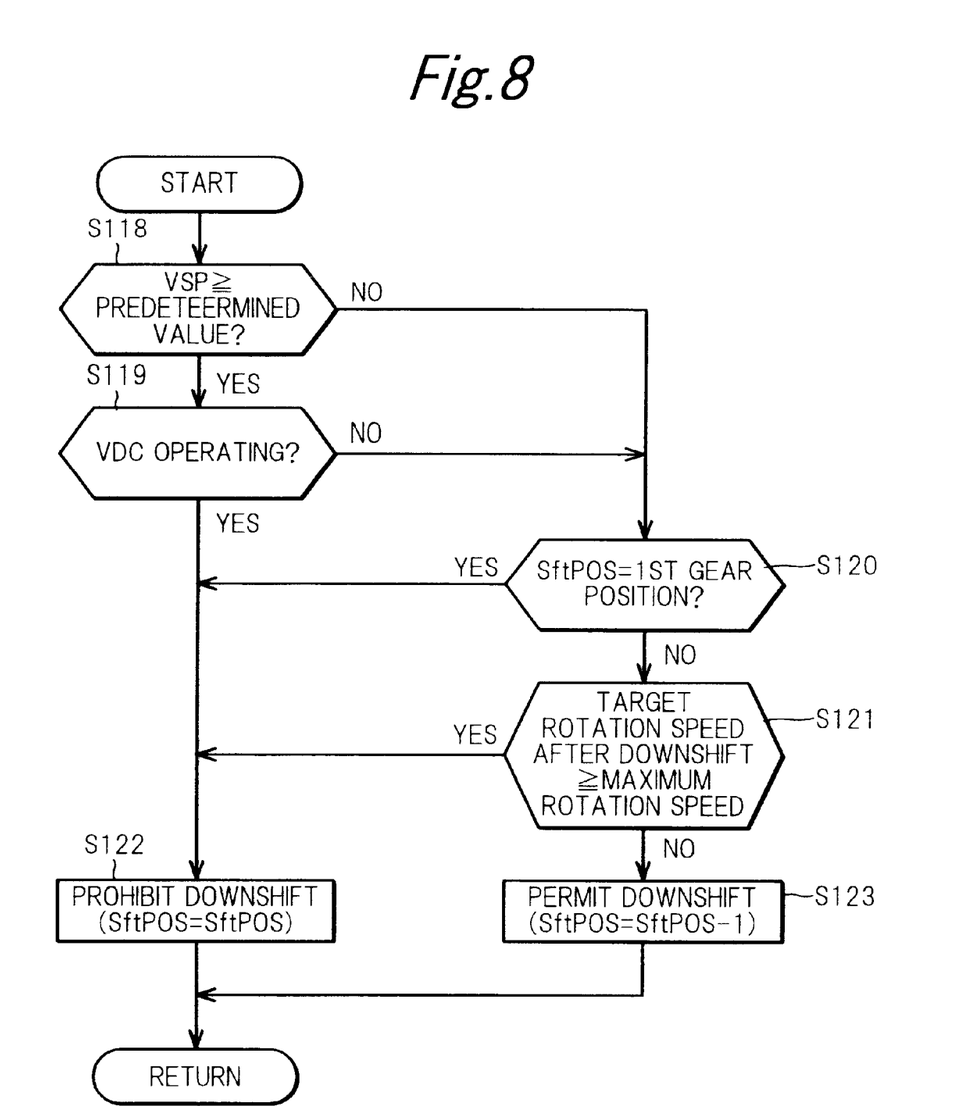
FIG. 8 is a flowchart for describing a downshift control subroutine in the manual shift mode.

When it is determined in the step S109 that the vehicle is in the downshift state wherein the down sign is ON, the routine proceeds to a step S110, and the downshift control shown in FIG. 8 is performed.

Figure 9:
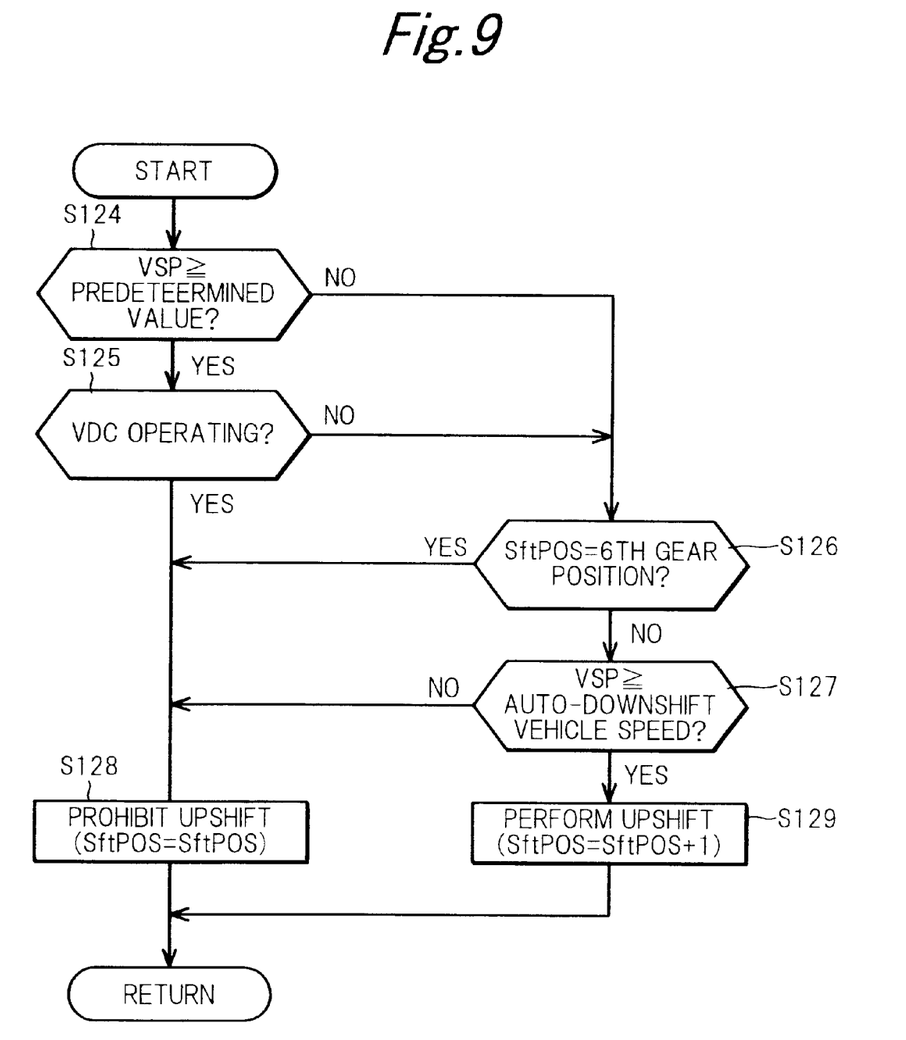
FIG. 9 is a flowchart for describing an upshift control subroutine in the manual shift mode.

When it is determined in the step S109 that the vehicle is in the upshift state wherein the up signal is ON, the routine proceeds to a step S111, and the upshift control shown in FIG. 9 is performed.

Figure 10:
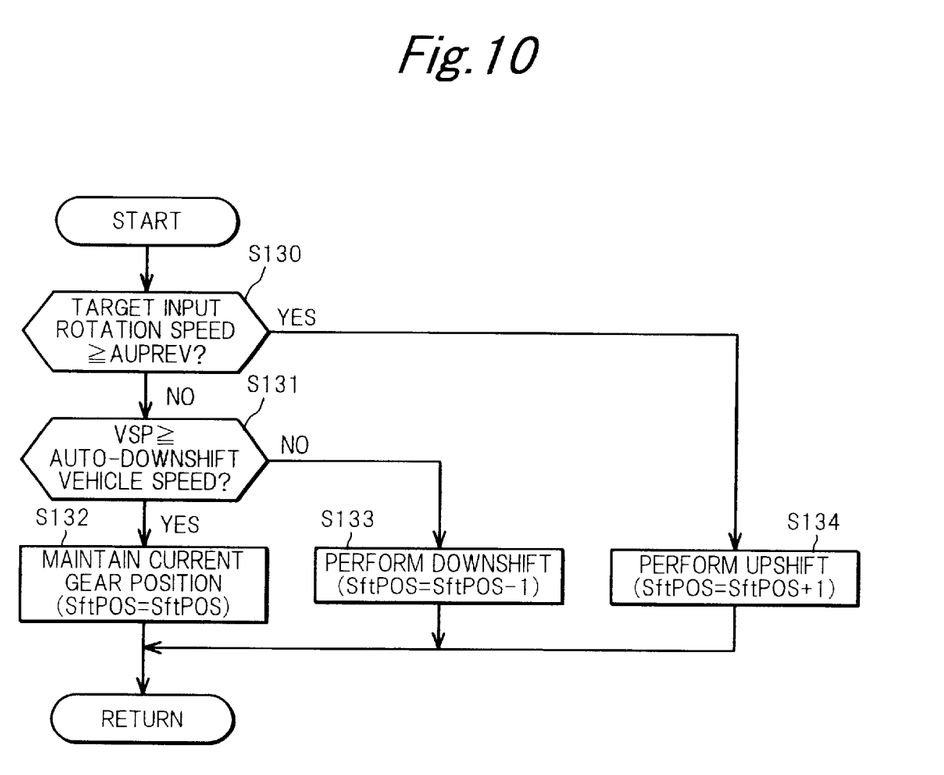
FIG. 10 is a flowchart describing a steady state control subroutine in the manual shift mode.

On the other hand, when it is determined in the step S109 that the vehicle is in neither the downshift state nor the upshift state, the routine proceeds to a step S112, and the steady state control shown in FIG. 10 is performed.

FIG. 7 is a subroutine for the initial control in the manual shift mode.

In a step S113, an input rotation speed InpREV (=Ni) of the transmission 10 is read from the input rotation speed sensor 64. Next, in a step S114, a minimum transmission input rotation speed InpREVmin after changing over from the automatic shift mode to the manual shift mode is obtained by adding a predetermined rotation speed DMOFST to the current input rotation speed InpREV (InpREVmin=InpREV+DMOFST).

In a step S115, a vehicle speed VSP detected by the vehicle speed sensor 63 is read. In a step S116, final input rotation speeds DSRREVn (=Ni*) which correspond to gear positions (n) are computed based on the vehicle speed VSP at that time.

Next, in a step S117, the highest gear position selected from among these gear positions satisfy the equation DSRREVn≧InpREVmin is set as a target gear position.

In this way, when there is a change-over from the automatic shift mode to the manual shift mode, the speed ratio immediately after the change-over is set to a speed ratio which definitively increases the speed by at least DMOFST relative to the input rotation speed InpREV of the transmission 10 at the speed ratio in the automatic shift mode before the change-over. In other words, when there is a change-over from the automatic shift mode to the manual shift mode, a downshift is performed wherein the input rotation speed InpREV of the transmission 10 definitively increases above the predetermined rotation speed DMOFST. Even when the accelerator is not depressed and there is a demand for engine braking, the input rotation speed increases by at least the predetermined rotation speed DMOSFT when the change-over is performed, and the engine braking desired by the driver is obtained.

Figure 12:
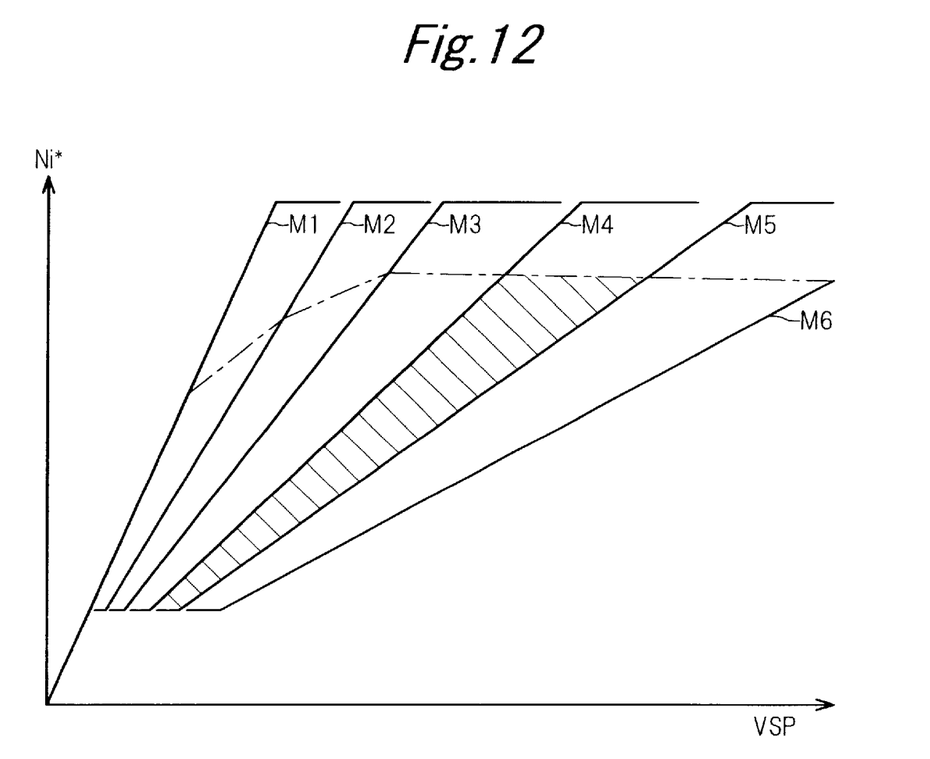
FIG. 12 is a diagram showing a region where the fourth gear position is selected when the shift mode is changed over from the automatic shift mode to the manual shift mode if the present invention is not applied.

If the present invention is not applied, when there is a change-over from the automatic shift mode to the manual shift mode, a gear position is selected to give an input rotation speed on the downshift side nearest to the input speed of the transmission 10 immediately prior to change-over. Taking the case when the gear position makes a downshift to the fourth gear position as an example, if the vehicle speed and real input rotation speed are in the shaded region as shown in FIG. 12 when the mode is changed-over, a downshift to the fourth gear position is performed.

Figure 11:
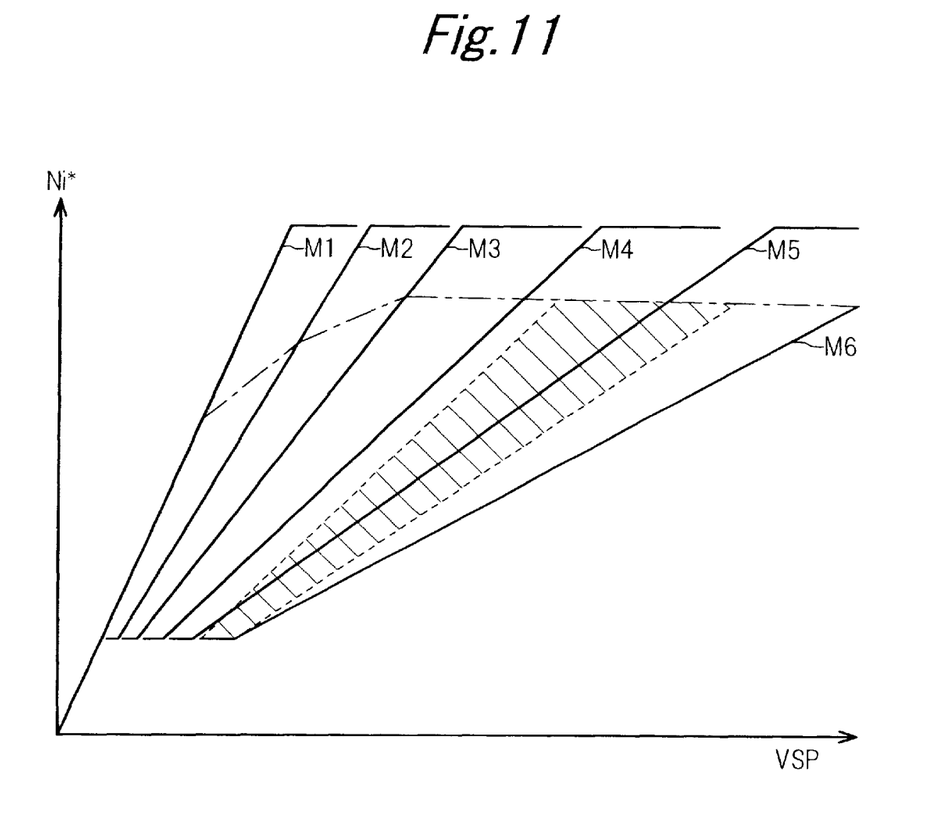
FIG. 11 is a diagram showing a region where the fourth gear position is selected when the shift mode is changed over from the automatic shift mode to the manual shift mode if the present invention applied.

On the other hand, according to this invention, when for example the predetermined rotation speed DMOFST is set to 500 rpm, if the vehicle speed and real input rotation speed are in the shaded region as shown in FIG. 11, a downshift to the fourth gear position is performed when the shift mode is changed over. The downshift to the fourth gear position can be performed at a lower input rotation speed and higher vehicle speed as compared with the case where this invention is not applied. Hence, the downshift to the fourth gear position is performed even in part of the region corresponding to the fifth gear position in FIG. 12. If the real input rotation speed is in a rotation speed region lower by 500 rpm than the input rotation speed which is the boundary of the fourth gear position in FIG. 12, a downshift to the third gear position is performed instead of a downshift to the fourth gear position in FIG. 11.

A downshift is performed which increases the real input rotation speed to be higher by a predetermined value when there is a shift mode change-over, so the lower the real input rotation speed becomes, the variation of speed ratio becomes larger, and the efficacity of engine braking when the accelerator is released and the vehicle is coasting can be maintained.

When there is a change-over from the automatic shift mode to the manual shift mode, in the manual shift mode which has a fixed speed ratio for each of plural gear positions, a highest gear position is set from among the gear positions which increase the input rotation speed by at least the predetermined rotation speed DMOFST relative to the current input rotation speed InpREV of the transmission 10. Therefore, if a shift map is provided to specify a final input rotation speed Ni* (=steady target input rotation) relative to the vehicle speed VSP (=output rotation speed of the transmission 10), as shown in FIG. 11, a speed ratio can be set to increase the input rotation speed by at least the predetermined rotation speed DMOFST relative to the current input rotation speed InpREV of the transmission 10 when there is a shift mode change-over by simple processing. There is no need to convert the input rotation speed to a speed ratio.

FIG. 8 shows a downshift control subroutine in the manual shift mode.

In a step Si 18, it is determined whether or not the vehicle speed VSP is greater than a predetermined value. If it is greater, the routine proceeds to a step S119, and if it is not greater, the routine proceeds to a step S120.

In the step S119, it is determined whether or not the VDC 350 is operating. The VDC 350 adjusts the braking force of the wheels and adjusts engine output when the vehicle's yawing or rolling is greater than a target value, and suppresses unstable vehicle behavior.

When the VDC 350 is operating, the routine proceeds to a step S122, and downshift is prohibited. Thus, downshift is not performed while the VDC 350 is operating, and vehicle behavior control performance of the VDC 350 is not reduced.

When the VDC 350 is not operating, the routine proceeds to a step S120, and it is determined whether or not a gear position SftPOS of the transmission 10 is the first gear position largest speed ratio).

If the gear position is the first gear position, the routine proceeds to the step S122, and if it is not, the routine proceeds to the step S121. When the position is the first gear position, a downshift cannot be performed to a lower gear, so downshift is prohibited in the step S122.

When the position is not the first gear position, in the step S121, it is determined whether or not the target input rotation speed of the transmission 10 after the downshift exceeds a maximum rotation speed when a downshift has been performed from the current gear position, and if it exceeds the maximum rotation speed, the routine proceeds to the step S122 and engine over speed is prevented by prohibiting downshift.

If the target input rotation speed does not exceed the maximum rotation speed, the routine proceeds to a step S123, and a downshift from the current gear position to a gear position one speed lower is permitted.

When it is determined in the step S118 that the vehicle speed VSP is a low speed less than the predetermined value, it is assumed that the effect of speed change is small even when the VDC 350 is operating, and downshift is permitted.

FIG. 9 shows an upshift control subroutine in the manual shift mode.

In a step S124, it is determined whether or not the vehicle speed VSP is greater than a predetermined value. If it is greater, the routine proceeds to a step S125, and if it is not, the routine proceeds to a step S126.

In the step S125, it is determined whether or not the VDC 350 is operating, and when it is operating, the routine proceeds to a step S128 and an upshift is prohibited. Hence, an upshift is prohibited during operation of the VDC 350, so vehicle behavior control performance is not reduced.

When on the other hand the VDC 350 is not operating, the routine proceeds to the step S126, and it is determined whether or not the current gear position SftPOS is the sixth gear position (smallest speed ratio).

When the gear position is the sixth gear position, an upshift to a higher gear position is impossible, so the routine proceeds to a step S128, and upshift is prohibited.

On the other hand, if it is not the sixth gear position, the routine proceeds to a step S127. In the step S127, it is determined whether or not the vehicle speed VSP is greater than an auto-downshift vehicle speed computed based on the target gear position SftPOS. If it is greater, the routine proceeds to a step S129. If it is not, the routine proceeds to the step S128, and interference between upshift and auto-downshift is prevented by prohibiting upshift.

In the step S129, an upshift is performed which changes the gear position to one speed higher than the current gear position.

FIG. 10 shows a steady state control subroutine in the manual shift mode.

In a step S130, it is determined whether or not the target input rotation speed is greater than an auto-upshift rotation speed AUPREV. If it is greater, the routine proceeds to a step S134, and over speed of the engine is prevented by performing an upshift automatically.

When the target input rotation speed is less than the auto-upshift rotation speed AUPREV, the routine proceeds to a step S131, and it is deterred whether or not the vehicle speed is greater than an auto-downshift vehicle speed computed based on the target gear position SftPOS. If it is greater, the routine proceeds to a step S132, and the current gear position is maintained.

However, if it is not greater, the routine proceeds to a step S133, and a downshift is performed automatically. In this auto-downshift control, as the continuously variable transmission 10 cannot change the speed ratio when the vehicle is not running it is performed so that the speed ratio changes to the largest speed ratio by the time the vehicle stops.

This invention is not limited to the aforesaid embodiments, various modifications being possible within the scope of the appended claims.

The present invention may also be applied to a vehicle comprising a V-belt continuously variable transmission, or an automatic transmission provided with a manual shift mode and plural gears.

The entire contents of Japanese Patent Applications P11-280362 (filed Sep. 30, 1999) and P11-280417 (filed Sep. 30, 1999) are incorporated herein by reference.

Although the invention has been described above by reference to a certain embodiment of the invention, the invention is not limited to the embodiment described above. Modifications and variations of the embodiments described above will occur to those skilled in the art, in light of the above teachings. The scope of the invention is defined with reference to the following claims.

What is claimed is:

1. A speed ratio control device for use with a vehicle provided with an automatic transmission, comprising:

an actuator which varies a speed ratio of the transmission, and a microprocessor for controlling the actuator and programmed to:
vary the speed ratio automatically according to a running state when an automatic shift mode is selected,
vary the speed ratio based on a manual operation when a manual shift mode is selected, and
set the speed ratio immediately after a change-over is made from the automatic shift mode to the manual shift mode, to a speed ratio which increases a transmission input rotation speed after the change-over more than a predetermined rotation speed compared to the transmission input rotation speed before the change-over.

2. A speed ratio control device as defined in claim 1, wherein the microprocessor is further programmed to:
set the speed ratio immediately after the change-over to a speed ratio selected from among speed ratios which increase the transmission input rotation speed after the change-over more than the predetermined rotation speed compared to the transmission input rotation speed before the change-over.

3. A speed ratio control device as defined in claim 1, wherein the microprocessor is further programmed to:
vary the speed ratio of the actuator in a stepwise manner in the manual shift mode when the transmission is a continuously variable transmission.

4. A speed ratio control device for use with a vehicle provided with an automatic transmission, comprising:
means for varying a speed ratio of the transmission automatically according to a running state when an automatic shift mode is selected,
means for varying the speed ratio of the transmission based on a manual operation when a manual shift mode is selected, and
means for setting the speed ratio immediately after a change-over is made from the automatic shift mode to the manual shift mode, to a speed ratio which increases a transmission input rotation speed after the change-over more than a predetermined rotation speed compared to the transmission input rotation speed before the change-over.

* * * * *